May 28, 1940.    J. T. RUCH    2,202,602
DEEP FAT COOKING APPARATUS
Filed July 27, 1939    3 Sheets-Sheet 1

INVENTOR.
JULIUS T. RUCH.
BY Lockwood, Goldsmith & Galt,
ATTORNEYS.

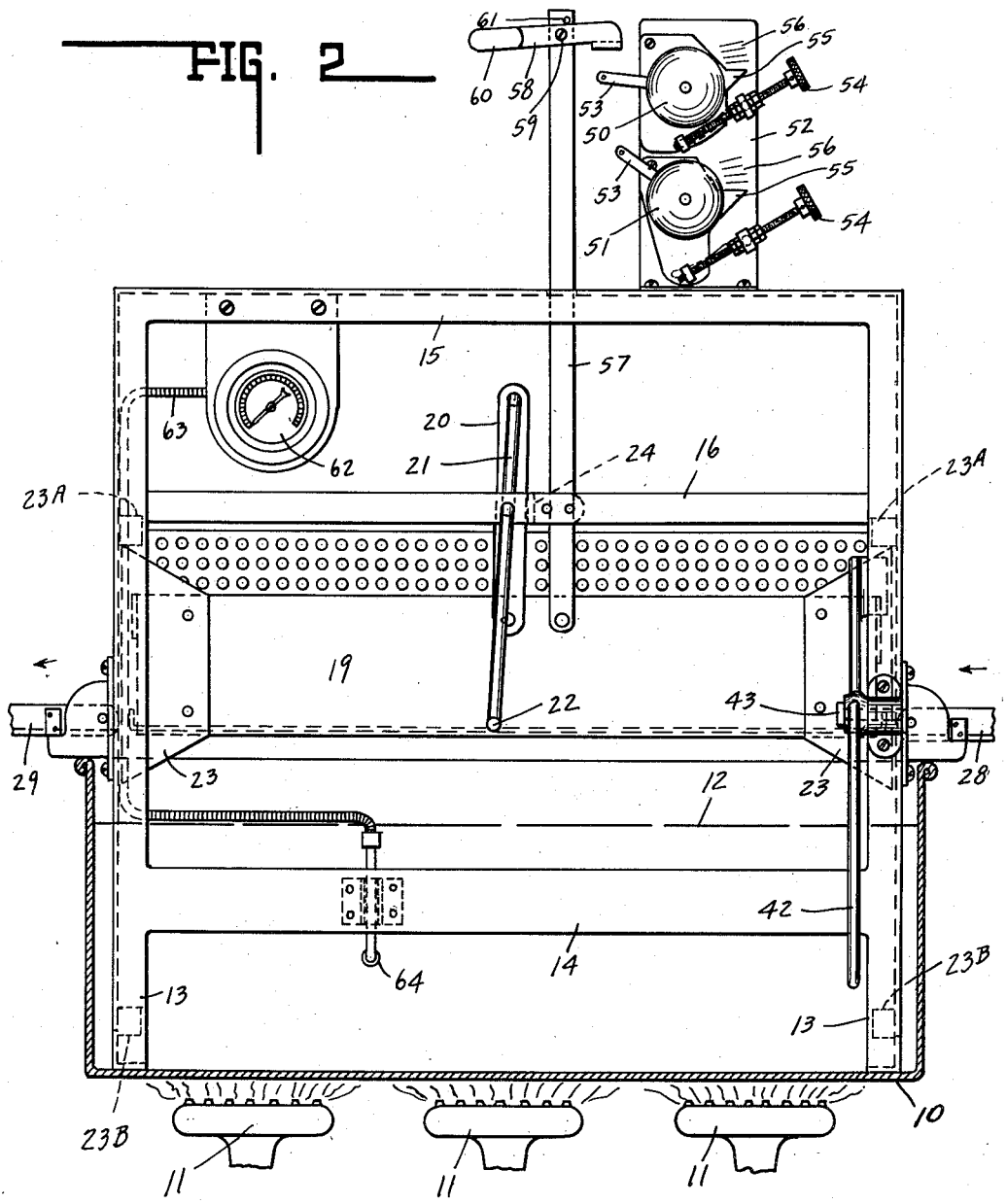

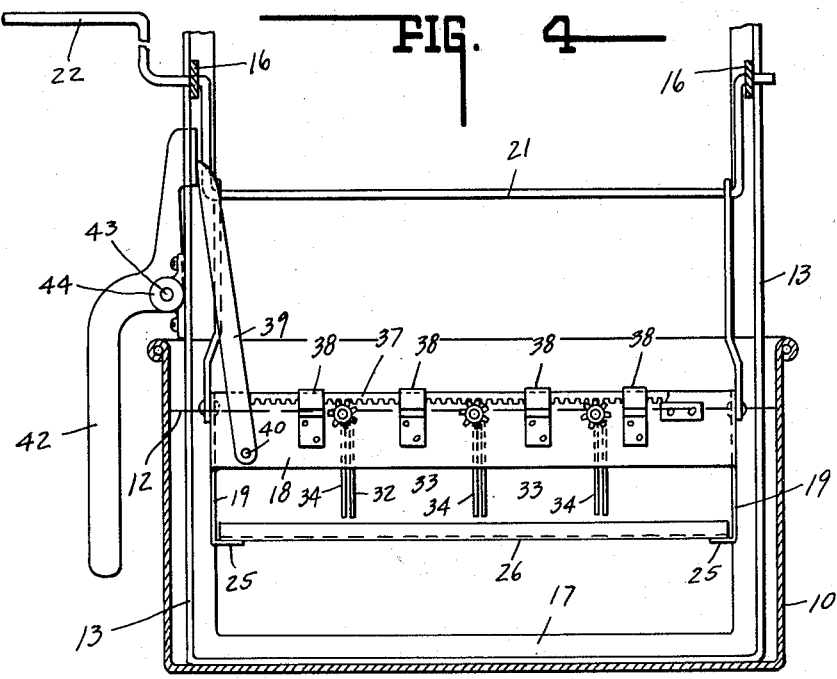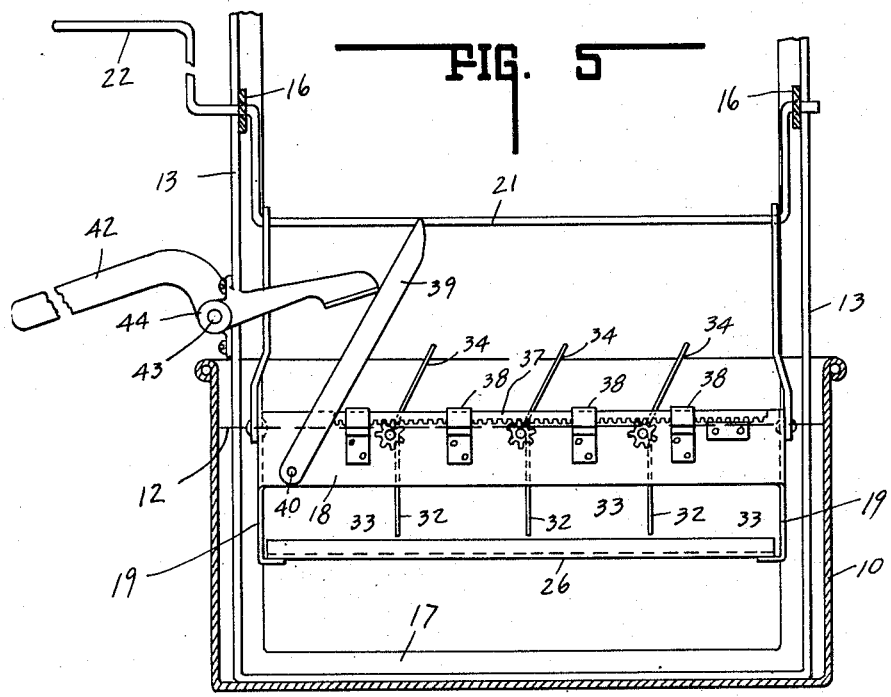

Patented May 28, 1940

2,202,602

UNITED STATES PATENT OFFICE 2,202,602

DEEP FAT COOKING APPARATUS

Julius T. Ruch, Indianapolis, Ind.

Application July 27, 1939, Serial No. 286,799

11 Claims. (Cl. 53—7)

This invention relates to a deep fat cooking apparatus particularly adapted for quantity production of doughnuts made from yeast dough.

Doughnuts made from cake mixes have been successfully made with automatic machinery for a number of years. Due to the fact that risen dough cannot be successfully formed into doughnut shapes by extrusion through a die ring, no such automatic process has been possible for that type of doughnut. Risen doughnuts have, therefore, generally required the full attention of one operator for the actual cooking operation, the cutting operation and the supervision of the rising of the dough or "proofing" requiring the time of a second operator.

An object of the present invention is to provide cooking apparatus for doughnuts of this type which can be taken care of by an operator who also does the cutting and proofing without materially lessening the time available for cutting and proofing. To this end the invention provides deep fat cooking apparatus in which a pallet carrying a number of uncooked doughnut shapes is lowered into the fat, together with simple means for simultaneously turning the whole group of doughnuts and other means for lifting the same from the fat as a unit. Timing means are employed to indicate to the operator the proper time for turning and for removing the cooked product. The operations required for the turning and removal are reduced to a minimum so that only a few seconds for each batch are required to be taken from the cutting and proofing operation.

Figure 1:
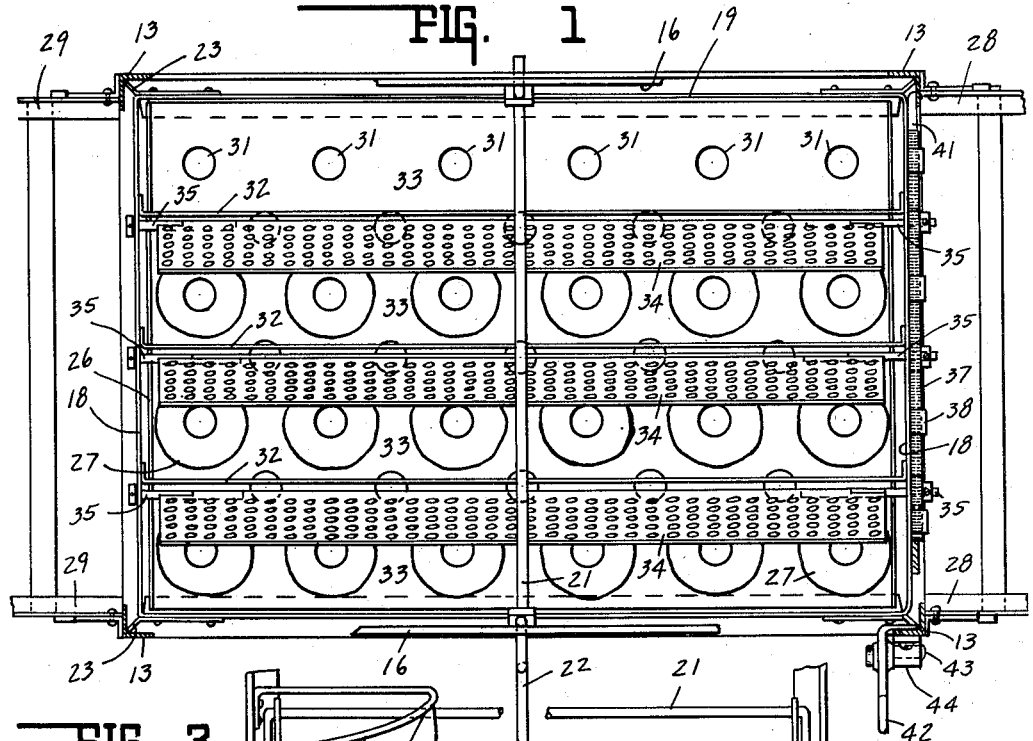
Figure 3:
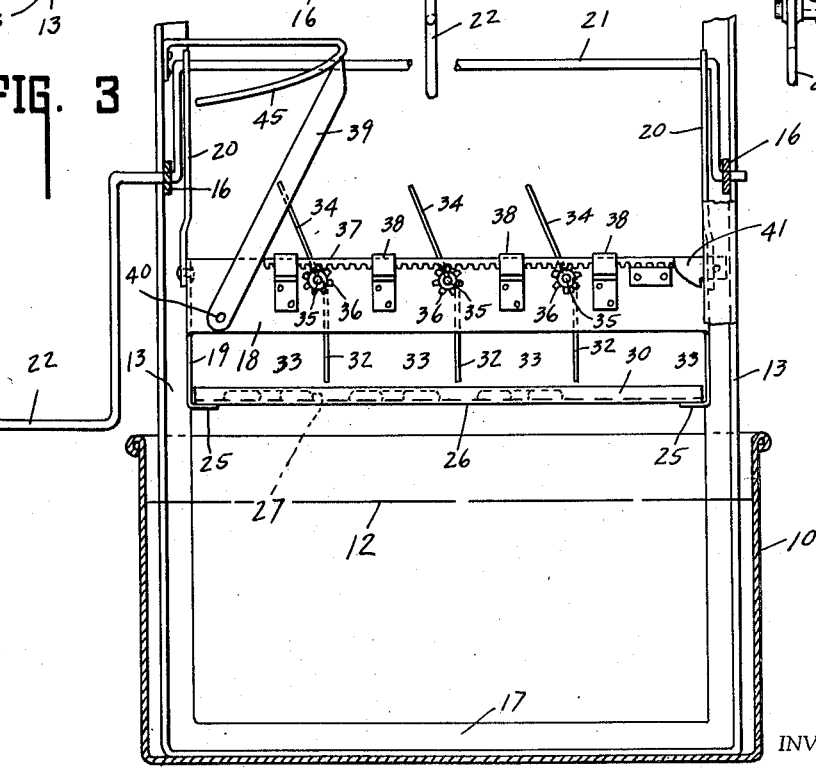

Other objects and features and the full nature of the invention will be understood from the accompanying drawings and the following description and claims:

Fig. 1 is a plan view with parts cut away of apparatus constructed in accordance with the invention. Fig. 2 is a side view thereof. Fig. 3 is an end view with parts in section and with the parts in the position assumed for receiving a pallet of uncooked doughnuts. Fig. 4 is a similar view showing the position of parts during cooking and before turning. Fig. 5 is a similar view showing the parts in the position assumed just after the turning operation is complete.

In the preferred form of the invention shown in the drawings by way of illustration, there is provided a kettle 10 heated by burners 11 of any suitable form and containing a supply of melted cooking fat whose upper surface is indicated at 12. A stationary frame structure consisting of corner posts 13, longitudinal connecting members 14, 15 and 16 and lateral connecting members 17 is placed with its lower portion within the kettle and resting on the bottom thereof.

A rectangular movable frame structure consisting of end plates 18 and side plates 19 is supported by links 20 on a crank bar 21. The crank bar 21 is journaled in the longitudinal frame members 16 and is provided at one side of the machine with a crank 22. The corner posts 13 of the stationary frame structure are L-shaped in form as best seen in Fig. 1, and the interior angles thereof receive wing members 23 which are secured to the side plates 19 of the movable frame structure and serve to guide the same in upward and downward movement with respect to the stationary frame. By means of the structure just described, the movable frame may be raised or lowered by turning the crank 22. In the upper position as shown in Fig. 2, the crank 22 is turned slightly over center and brings one of the links 20 against a stop 24 carried by one of the longitudinal frame members 16. Said stop thus holds the movable frame structure in its upper position. To lower the movable frame structure the crank 22 is turned in the counterclockwise direction, referring to Fig. 2. In its upper and lower positions the movable frame structure is held level by engagement of the wing members 23 with stops 23A and 23B respectively which are secured to the inner faces of the frame members 13.

The lower ends of the side plates 19 are inwardly bent to form trackways 25, seen in Figs. 3, 4 and 5, which serve to support a pallet 26 adapted to carry doughnuts 27 or other product to be similarly cooked. At opposite ends of the machine there are provided trackways 28 and 29 respectively, each suitably supported on the stationary frame structure. Said trackways are located with respect to the trackways 25 so that pallets may be moved with a sliding motion from the trackway 28 to the trackway 25 and thence to trackway 29. The pallets are provided with upturned rims 30 so that each pallet entering the trackways 25 may push the preceding pallet to the trackway 29.

When a pallet has been placed on the trackway 25 and the crank 22 turned in the counterclockwise direction (Fig. 2), the pallet is lowered beneath the surface of the fat and carries with it the uncooked product which may float to the surface of the fat as soon as the cooking operation has proceeded sufficiently far to give it the necessary buoyancy. The pallets are provided with openings 31 through which the fat may pass as the pallets are lowered. Thus turbulent movement of the fat which might damage the product is prevented. Pallets formed of wire mesh or other open work construction may also be used.

The end plates 18 of the movable frame structure have secured thereto a plurality of dividers 32 in the form of vertical plates adapted to divide the fat above the pallet 26 into a plurality of parallel channelways 33. Herein said channelways are four in number and the product 27 is placed on the pallet 26 in parallel rows, each of which is positioned immediately beneath one of said channelways. As best seen in Figs. 1 and 3, no product is placed on the pallet beneath the righthand channelway of Fig. 3. As the product rises to the surface, each row is confined in one of the channelways and movement thereof on the surface of the fat is substantially prevented.

For turning the product when cooking on one side has been completed, there are provided a plurality of perforated turning blades 34. Each of said blades has secured thereto a pair of pivot pins 35 journaled on the end plates 18 of the movable frame structure. Said pivot pins are located close to the upper edges of the dividers 32 and are adjacent the upper surface 12 of the fat when the movable frame structure is in its lowermost position, Figs. 4 and 5. At one end of the machine the pivot pins 35 carry pinions 36 meshing with a rack 37 which is guided for horizontal sliding movement by guide members 38 carried by the end plate 18. One end of the rack 37 rests against a lever 39 pivoted by a pin 40 to the end plate 18. The opposite end of said rack is engageable by a cam member 41 (Figs. 1 and 3) which is secured to one of the corner posts 13 of the stationary frame structure. In the lowered position of the movable frame structure the lever 39 is engageable by the upper end of a hand lever 42 which is pivotally mounted on a pin 43 secured in a bearing member 44 attached to one of the corner posts 13. The upper end of the lever 39 is engageable with a cam member 45 (Fig. 3) secured to the corner post 13.

In the operation of the turning blades 34 they normally rest in the position shown in Fig. 3 when the movable frame structure is in its upper position. In this position the blades 34 project upwardly and are inclined to the left of their pivotal axes. The weight of said blades tends to move the rack 37 to the left into engagement with the lever 39, the upper end of said lever engaging the cam 45 to maintain the parts in this position. As the crank 22 is rotated to lower the product into the fat, the upper end of the lever 39 follows the curve of the cam 45 and said cam is properly shaped to permit the blades 34 to move downwardly by gravity and to restrain said movement so that they move gently downward without sudden shock to the position shown in Fig. 4. In this position the blades 34 hang vertically downward beneath their pivot axes. In the downward movement of the frame structure, the blades 34 reach this position before the product reaches the surface of the fat and thus do not interfere with said product.

At the proper time for turning the product, the hand lever 42 is moved to the position shown in Fig. 5, the upper end of said lever pressing the lever 39 to the right. The lever 39 engages the rack 37 and moves said rack to rock the blades 34 about their pivotal axes to a position in which each blade extends upwardly and to the right of its pivotal axis and rests against the upper edge of the adjacent divider 32. In this movement of the blades 34, each blade engages the undersurface of the product in its associated channel 33, carries the same upwardly over the adjacent divider 32 and deposits the same in an inverted position in the adjacent channel. This operation is completed by a single movement of lever 42 after which said lever may be dropped and the remaining parts remain in the position of Fig. 5. When the second portion of the cooking operation is complete, the crank 22 is rotated in the clockwise direction to raise the movable frame structure and the pallet 26. Said pallet engages the product and removes the same from the fat. Near the end of the upward movement, the rack 37 engages the cam 41 and is moved to the left to restore the blades 34 to the original position shown in Fig. 3.

In order to relieve the operator of the necessity of continuously watching the cooking operation, there are provided a pair of timing devices 50 and 51 mounted on a plate 52 carried by one of the longitudinal frame members 15. Said timing devices are of a standard commercial form which need not be described in detail. It is sufficient to say that in each of said devices a downward pressure on a lever 53 initiates the operation of a clock mechanism which operates an audible alarm at the end of a predetermined period of time. The duration of the periods for each of said mechanisms may be adjusted by means of adjusting screws 54, and the length of time for which the devices are set is indicated by pointers 55 cooperating with calibrated scales 56. A vertical member 57 is secured to one of the side plates 19 of the movable frame structure and carries at its upper end a dog 58 pivotally mounted thereto by a pin 59 and normally held by a counterweight 60 against a stop pin 61. By means of this construction the dog 58 successively strikes the lever 53 in the downward movement of the movable frame structure at the start of the cooking operation. The timing device 50 is set at the proper time interval to indicate the time for turning the product. The timing device 51 is similarly set for the proper interval for removing the product from the fat and placing a new pallet of uncooked product in the apparatus.

A thermometer 62 is mounted on one of the frame members 15 and connected by a tube 63 with a thermometer bulb 64 within the body of the fat. Said thermometer enables the operator to maintain the proper temperature of the fat for the cooking operation by control of the burners 11.

In the use of the apparatus a single operator may take care of the cutting of the dough, may supervise the proofing and attend to the cooking of the product as well. As long as the temperature of the fat is properly maintained, the only labor required in the cooking operation is the single movement necessary to turn the product when the proper time is indicated by the first timing device and the three simple movements of lifting the product from the fat, pushing a new pallet of uncooked product into place and lowering the same into the fat when the proper time is indicated by the second timing device. Each of these operations may be done in a very few seconds and since each operation takes place only once in several minutes, the interruptions of the cutting and proofing operations are substantially negligible. Preferably the size of the apparatus is such that it handles all of the product which can be cut and proofed by a single operator.

However, larger machines may sometimes be employed to handle the output of more than one operator.

The foregoing specifications describe the invention in one of its preferred forms. The details thereof may be varied without departing from the scope thereof as defined by the appended claims.

The invention claimed is:

1. In deep fat cooking apparatus, a kettle adapted to hold a supply of cooking fat, a stationary frame structure, a movable frame structure supported thereon and movable upwardly and downwardly with respect to said kettle, a carrying pallet for a plurality of articles to be cooked, said pallet being carried by said movable frame structure and passing beneath the surface of said fat when said structure is lowered, whereby said articles may float to the surface of said fat, and means carried by said movable frame structure for turning the floating articles.

2. In deep fat cooking apparatus, a kettle adapted to hold a supply of cooking fat, a stationary frame structure, a movable frame structure supported thereon and movable upwardly and downwardly with respect to said kettle, a carrying pallet for a plurality of articles to be cooked, said pallet being carried by said movable frame structure and passing beneath the surface of said fat when said structure is lowered, whereby said articles may float to the surface of said fat, and means carried by said movable frame structure for simultaneously turning a plurality of the floating articles.

3. In deep fat cooking apparatus, a kettle adapted to hold a supply of cooking fat, a stationary frame structure, a movable frame structure supported thereon and movable upwardly and downwardly with respect to said kettle, a carrying pallet adapted to carry a row of articles to be cooked, said pallet being carried by said movable frame structure and passing beneath the surface of said fat when said structure is lowered, whereby said articles may float to the surface of said fat, means carried by said movable frame structure and adapted to preserve the alignment of said row of articles while floating, and means for simultaneously turning the entire row of floating articles.

4. In deep fat cooking apparatus, a kettle adapted to hold a supply of cooking fat, a stationary frame structure, a movable frame structure supported thereon and movable upwardly and downwardly with respect to said kettle, a carrying pallet adapted to carry a row of articles to be cooked, said pallet being carried by said movable frame structure and passing beneath the surface of said fat when said structure is lowered, whereby said articles may float to the surface of said fat, means carried by said movable frame structure and forming a channel in which the articles are received as they float to the surface and forming a second channel parallel thereto, and means carried by said movable frame structure and adapted to move said row of articles from the first to the second channel and to invert said articles during said movement.

5. In deep fat cooking apparatus, a kettle adapted to hold a supply of cooking fat, a stationary frame structure, a movable frame structure supported thereon and movable upwardly and downwardly with respect to said kettle, a carrying pallet adapted to carry a row of articles to be cooked, said pallet being carried by said movable frame structure and passing beneath the surface of said fat when said structure is lowered, whereby said articles may float to the surface of said fat, a divider carried by said movable frame structure and defining a pair of parallel channels in the fat in one of which channels said row of articles is received as they float to the surface, and a turning blade pivotally mounted on said movable frame structure with its axis parallel to and adjacent said divider, said blade being adapted when moved on its pivotal mounting to engage the undersurfaces of the floating articles, carry the same over said divider and into the second channel and invert the same during said movement.

6. In deep fat cooking apparatus, a kettle adapted to hold a supply of cooking fat, a stationary frame structure, a movable frame structure supported thereon and movable upwardly and downwardly with respect to said kettle, a carrying pallet adapted to carry a plurality of rows of articles to be cooked, said pallet being carried by said movable frame structure and passing beneath the surface of said fat when said structure is lowered, whereby said articles may float to the surface of said fat, a series of dividers carried by said movable frame structure and defining a plurality of parallel channels in said fat, each of said rows of articles as they float to the surface being confined in one of said channels, a plurality of turning blades pivotally mounted on said movable frame structure each with its pivotal axis parallel to and adjacent one of said dividers, and means connecting said blades and adapted to rock the same simultaneously on their pivotal mountings to engage the undersurfaces of said articles, transfer the same from one of said channels to an adjacent channel and invert the same during said transfer.

7. In a deep fat cooking apparatus, a kettle adapted to hold a supply of cooking fat, a stationary frame structure, a movable frame structure supported thereon and movable upwardly and downwardly with respect to said kettle, a carrying pallet for a plurality of articles to be cooked, said pallet being carried by said movable frame structure and passing beneath the surface of said fat when said structure is lowered, whereby said articles may float to the surface of said fat, means restraining the floating articles against movement on the surface of said fat, and turning members pivotally mounted on said movable frame and adapted when moved on their pivotal mountings to engage the undersurfaces of said articles, lift the same clear of the fat, invert the same and return them to said fat in an inverted position.

8. In deep fat cooking apparatus, a kettle adapted to hold a supply of cooking fat, a stationary frame structure, a movable frame structure supported thereon and movable upwardly and downwardly with respect to said kettle, a carrying pallet for a plurality of articles to be cooked, said pallet being carried by said movable frame structure and passing beneath the surface of said fat when said structure is lowered, whereby said articles may float to the surface of said fat, means restraining the floating articles against movement on the surface of said fat, turning members pivotally mounted on said movable frame and adapted when moved on their pivotal mountings from an initial position to engage the undersurfaces of said articles and invert the same, and means operating in the downward movement of said movable frame structure to return said turning members gently to their initial position.

9. In deep fat cooking apparatus, a kettle adapted to hold a supply of cooking fat, a stationary frame structure, a movable frame structure supported thereon and movable upwardly and downwardly with respect to said kettle, a carrying pallet for a plurality of articles to be cooked, said pallet being carried by said movable frame structure and passing beneath the surface of said fat when said structure is lowered, whereby said articles may float to the surface of said fat, means restraining the floating articles against movement on the surface of said fat, turning members pivotally mounted on said movable frame structure, the pivotal axis thereof being horizontal and adjacent the surface of the fat and said turning members initially hanging downwardly in the fat when said structure is in its lower position, and means operable in the lower position of said movable frame structure to rock said turning members upwardly and over the axes of their pivotal mountings to engage the articles and invert the same.

10. In deep fat cooking apparatus, a kettle adapted to hold a supply of cooking fat, a stationary frame structure, a movable frame structure supported thereon and movable upwardly and downwardly with respect to said kettle, a carrying pallet for a plurality of articles to be cooked, said pallet being carried by said movable frame structure and passing beneath the surface of said fat when said structure is lowered, whereby said articles may float to the surface of said fat, means restraining the floating articles against movement on the surface of said fat, turning members pivotally mounted on said movable frame structure, the pivotal axis thereof being horizontal adjacent the surface of the fat and said turning members initially hanging downwardly in the fat when said structure is in its lower position, means operable in the lower position of said movable frame structure to rock said turning members upwardly and over the axes of their pivotal mountings to engage the articles and invert the same, and means automatically operated in the movement of said movable frame structure for returning said turning members to their initial positions.

11. In deep fat cooking apparatus, a kettle adapted to hold a supply of cooking fat, a stationary frame structure, a movable frame structure supported thereon and movable upwardly and downwardly with respect to said kettle, a carrying pallet for a plurality of articles to be cooked, said pallet being carried by said movable frame structure and passing beneath the surface of said fat when said structure is lowered, whereby said articles may float to the surface of said fat, means restraining the floating articles against movement on the surface of said fat, turning members pivotally mounted on said movable frame structure, the pivotal axis thereof being horizontal and adjacent the surface of the fat and said turning members initially hanging downwardly in the fat when said structure is in its lower position, means operable in the lower position of said movable frame structure to rock said turning members upwardly and over the axes of their pivotal mountings to engage the articles and invert the same, means automatically operated by upward movement of said movable frame structure for returning said turning members over their pivotal axes to a position in which they are biased toward their initial position by gravity, and cam means holding said turning members in said last mentioned position while said movable frame structure is in its upper position and permitting a gentle return thereof to the initial position during the downward movement of said structure.

JULIUS T. RUCH.